Oct. 12, 1954 — J. R. OISHEI ET AL — 2,691,186
WINDSHIELD CLEANER
Filed Oct. 29, 1951 — 4 Sheets-Sheet 1

INVENTOR.
JOHN R. OISHEI AND MARTIN BITZER
BY
Bean, Brooks, Buckley & Bean
ATTORNEYS Oct. 12, 1954   J. R. OISHEI ET AL   2,691,186
WINDSHIELD CLEANER
Filed Oct. 29, 1951   4 Sheets-Sheet 2

INVENTORS
JOHN R. OISHEI AND MARTIN BITZER
BY
Bean, Brooks, Buckley & Bean
ATTORNEYS Oct. 12, 1954  J. R. OISHEI ET AL  2,691,186
WINDSHIELD CLEANER
Filed Oct. 29, 1951  4 Sheets-Sheet 4

INVENTORS
JOHN R. OISHEI AND MARTIN BITZER
BY
Bean, Brooks, Buckley & Bean.
ATTORNEYS

Patented Oct. 12, 1954

2,691,186

UNITED STATES PATENT OFFICE

2,691,186

WINDSHIELD CLEANER

John R. Oishei, Buffalo, and Martin Bitzer, Kenmore, N. Y., assignors to Trico Products Corporation, Buffalo, N. Y.

Application October 29, 1951, Serial No. 253,636

25 Claims. (Cl. 15—253)

This invention relates generally to the windshield cleaning art and more particularly to a wiper capable of maintaining a clear field of vision over a larger area on curved windshields and better maintenance of cleared areas which become more quickly clouded, as in operating the modern automobile where the speed of travel is a considerable factor.

In the light of the existence of already completed and the elaborately planned thruways under construction, the need for greater capacity to remove moisture from the windshields of motor vehicles has developed. Legal speed of as high as seventy miles an hour, soon to be authorized most generally, means that vehicles henceforth will be traveling in shorter intervals of time through more moisture laden air space. The greater rain accumulation deposited can only be met by a proportionately increased moisture lifting capacity. Long and extended straightaways with roadway vision unobstructed without exception for stretches of one thousand feet ahead at all times for safety, cannot be considered safe unless under all conditions of driving with the long range highway ahead, vision can be maintained through the windshield. Highly excessive blade motion is not the answer to the maintenance of a clear glass for the reason that excessively high speed oscillation of the blade is impractical, due to the blade and arm pressure limitations and the accumulated inertia factor which is further emphasized now in the mounting of heavier arms and blades required to follow the contour of curved glass to wipe satisfactorily. At excessive speeds the wiper will tend to roll excessively and to skim over the wet film, failing to properly clear the field of vision. Consequently, a higher optimum speed for the oscillating wiper is insufficient in itself to cope with the faster rain accumulation.

The advent of the curved windshield, by which latter the front and side portions have been blended in one continuous surface, and the more extensive use of the curved shield have introduced further factors to be dealt with in the windshield wiper art. Heretofore windshields have provided only a relatively small degree of curvature to the driver's left by reason of the position of the corner or pillar posts. Structural changes in the car body have now been made to sweep the windshield in a continuous surface on a relatively short radius around the corner. This construction results in eliminating the cause of objectionable air noise otherwise present and traceable to the presence of the pillar post which obstructed the rushing air and converted these wind currents into noise-creating eddies. The moving of the corner pillar aft, or its removal in fact, has had the effect of eliminating this and at the same time of broadening the field of vision while providing more glass surface on which to extend wiper blade travel. Increased curvature on the opposite side portions of the windshield has carried the glass uninterruptedly back from the front corners of the shield to a depth of almost twelve inches.

The conventional arrangement of employing a single wiper for the driver's side of the shield and another one for the passenger side fails to clear a broad enough area because of the extended width and shallow height of the shield, which limits the length of the wiper blade. With concentrated curvature at the sides, the available side areas must be cleared to utilize these spaces for vision. Drivers becoming accustomed to a wider range of vision while driving in fair weather would be otherwise deprived of this unobstructed side vision while driving in rain or wet snow.

According to this invention advantage is taken of the increased side area by mounting an auxiliary wiper to pivot from a point located to the left of the line of vision to clean not only this side area but also to coact with the front or primary wiper in effecting a more expeditious cleaning of the primary frontal area for straightahead vision. This extended side area to the left of the driver is therefore serviced by an additional wiper that swings across the line of sight of the driver in synchronized and phase relation with its companion primary wiper of maximum length which swings from a further inboard pivot across the driver's line of sight. Consequently, the paths of the dual wipers will overlap for a substantial portion of the windshield with the outer arcs of their paths intersecting substantially in front of the driver and above his forward line of sight. A double wiping therefore takes place in the most important vision area, it being swept by both wipers during the same cycle wherein the other areas are cleaned once. This is done without resorting to the otherwise objectionable high speed of wiper motion.

Therefore, the main object of the invention is to obtain in a practical manner greater relief from deposits of moisture in the area of the windshield constituting the principal line of sight, and greater safety by reason of the better vision. The multiple oscillating wipers, moving in substantial parallelism, are arranged to pass over a common area of sufficient width and height that constitutes the vital area employed to maintain safe driving vision at all speeds and in particular at times of faster car travel. The principal vision area is cleaned twice with each motor stroke. The two wipers are mechanically tied together to move in timed order substantially to split the time interval which heretofore has lapsed between successive strokes of the oscillating wiper, thus securing the result of a repetitive wiping, which a single blade moving at twice the speed could not accomplish as satisfactorily.

In passing through a given distance with the overlapping wipers, the accumulation of a given precipitation on the glass at any time would not be substantially in excess of the covering of the glass in traveling half the distance. A car traveling at 30 miles per hour moves 44 feet in one second. A wiper running at 120 wipes per minute will make two wipes per second or one wipe for every 22 feet of car travel. At 60 miles per hour the car will travel 88 feet per second, providing one wipe for every 44 feet. Naturally more moisture will gather on the shield to obstruct the view when traveling twice the distance. By means of the present installation the number of moisture-removing wipes across the line of sight is doubled, to provide the same degree of vision at a slower wiper speed that might be expected at a higher wiper speed which higher speed is impractical for many reasons including those above stated.

In earlier usages dual wipers have not been employed for the dual sweeping of the glass in front of the driver to cover the vital area that is used principally and of necessity continuously along the open highways. Parallel moving wipers have been confined to right and left mounting on the shield and any overlap in their paths has been incidental and without utility since the overlap was at the center of the shield, to the right of the driver and out of his line of vision. So it had to be disregarded from the standpoint of improved vision.

It has also been proposed to mount overlapping wipers at the top and bottom margins of the flat windshields in opposed relation but the major purpose was to scarify and produce a scrubbing action and not to provide more wiping strokes in a given area. Provision was made to stop one blade from traveling while the other blade made the stroke clear across, and vice versa. In a second showing to scarify the non-parallel and out of phase blades were likewise mounted at the opposite sides of the windshield on two wiper transmission mechanisms which were flexibly geared by an engine driven flexible cable that encircled half the perimeter of the windshield, a distance normally taking some six or seven feet of flexible shaft, and that provided a wholly impractical construction involving abnormal frictional resistance and an uneven loading on the two wipers, all tending through the ununiform turning torque of the shaft to upset a proposed synchronous motion of two blades to such an extent at variable speed as to defy the maintenance of the necessary movement of the two blades to avoid one obstructing the other and locking. In both showings, the greatest cleaning occurred at the center of the automobile and to the right of the driver's line of vision.

In the present invention the travel of the primary blade to the side is preferably limited to a semi-upright position, and within the path of the companion blade, to extend the area of overlap upwardly to come directly in the principal line of vision, and at eye level, with sufficient leeway up and down as well as laterally to afford visibility of the entire roadway on both sides at a relatively short distance ahead of the vehicle and stretching out as far ahead as the eye can see. The elveation and extent of the doubly-wiped principal area of vision may be determined by placement of the companion shafts in such proximity as to cause the outer arcs of the wiper paths to intersect above the line of sight. Both blades utilize a maximum sweep to broaden the field of vision by an enlarged secondary area on which the rain accumulates as heretofore over relative longer periods between wipes, as compared to the doubly wiped primary area. Both blades will come to rest in a horizontal position when parked, pointing toward the center along the windshield frame.

From this parked position the cooperating wipers move in synchronism but preferably with a speed differential to provide a greater angular movement to the side wiper. This will enable the side wiper to carry its collected moisture on each stroke in a downward direction to deposit it adjacent the lower margin of the windshield. It also functions to wipe the side area clear of wind inaugurated side wash of the water left by the primary blade. On the curved windshield equipped with only one wiper blade moving across the line of sight, the water picked up in the movement toward the side of the shield is acted upon by the air currents which flow constantly from the center to the side. This windstream effect produces a water curtain of multiple rivulets through which clear vision is denied. That section of the shield beyond which the conventional single wiper travels is never clear. This forms a permanent obstruction while driving in the rain, that cuts the angle of vision down to somewhat the equivalent of the former limitations where pillar posts were present. By means of the secondary wiper positioned to travel in and out of the area beyond the area covered by the primary blade, this obscuring wind-moved heavy water deposit—left in undulating rivulets and flowing substantially horizontally under the airstream impact—is lifted out of the available side vision area and carried down to the bottom edge of the shield, thus opening the side windshield area to provide vision therethrough.

It is, therefore, a further object of the invention to provide a plural wiper arrangement by which the moisture deposited by a primary wiper is carried from the field of vision by a secondary wiper moving in from the side to thereby facilitate the maintenance of the cleaned vision area.

Again it is imperative to have the wiper, usually of blade form, assume a modified angle with the surface. When the windshield surface moves out of a fixed plane, as on a deeply curved shield, the blade has to change in its path of travel to continue to maintain its proper relationship with the surface. Heretofore the problem of cleaning a windshield glass has comprised the cleaning of only the front windshield. The amount of total curvature from the one side of the wiper sweep to the other has been relatively small and the usual fixed arm provided a suitable support for a blade constructed to work over a curved surface. In the present instance the wiper is operated back and forth from the front surface around the corner to the side surface. In this operation there is so much change in the angle of the plane in front with respect to the plane at the side that the proper mounting for the blade requires a tilting arrangement by which the wiper or its mounting clip at the end of the arm will always be substantially at normal to the surface of the windshield at the point of blade contact. The wiper must react to a controlled tilting about its longitudinal axis whereby to maintain the desired normal attitude on or positional accord with the windshield surface. As long as the wiper or blade is held in a position normal to the surface, the scratching of the windshield by the flexible support for the blade is successfully precluded.

A further important object of the invention, therefore, is to provide a windshield cleaner wherein the wiper is automatically controlled to maintain a substantially normal positional accord with all portions of the curved surface traversed by the wiper to secure uniformity in the blade contact with the varying contours of the glass as they are wiped over.

In addition, it is an object of the instant invention to provide a windshield cleaner having a multiplicity of wiping elements driven relative to each other to move before the eyes in phase and in such a manner as to present the least distraction in interference to vision through the windshield and to assume a parked position along an edge of the windshield and substantially out of the operator's field of vision therethrough.

It is also an object of the invention to provide a windshield cleaner having the aforementioned characteristics, including motion transmission mechanism designed to transmit oscillating movement to out of line wiper and variable angularity shafts, and which is relatively inexpensive to manufacture, simple and compact in construction, and completely reliable in operation.

The foregoing and other objects will become apparent upon reading the ensuing detailed description together with the accompanying drawing wherein.

Figure 1:
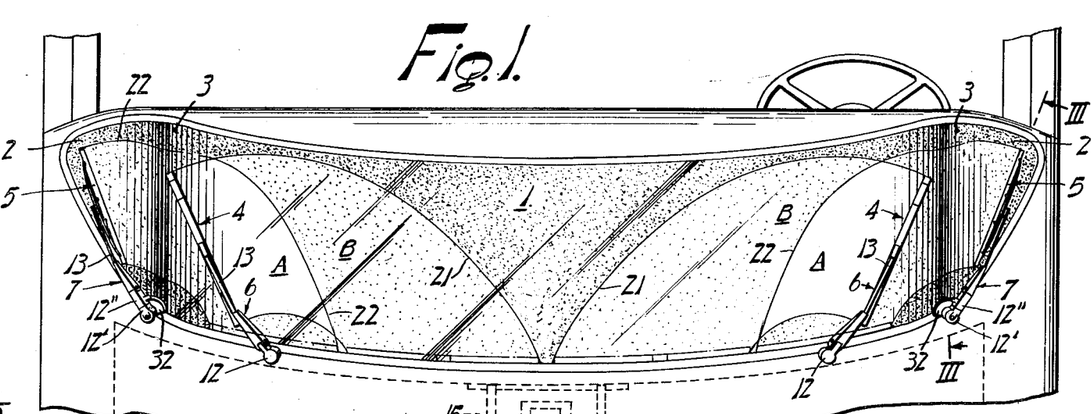
Fig. 1 is a plan view of a vehicle having a curved windshield and showing the windshield cleaner of the instant invention installed in place.

The windshield cleaner of the present invention is shown installed in place on a vehicle having a curved windshield with a broad frontal portion 1, which may possess a slight curvature, and lateral portions 2 including the connection bends or curved portions 3 of relatively extreme curvature.

Figure 3:
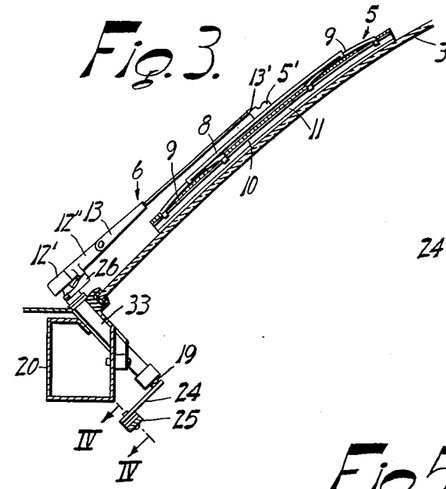
Fig. 3 is a sectional view taken along the line III—III of Fig. 1.
Figure 4:
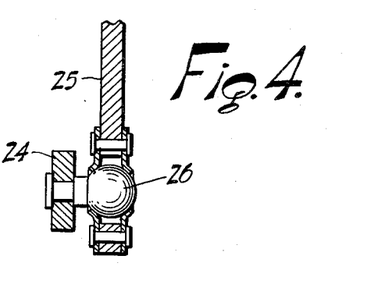
Fig. 4 is a detailed view in section through the power transmission, as seen about on line IV—IV of Fig. 3.

The windshield cleaner itself comprises dual pairs of cooperating wiping elements 4 and 5, one pair for the driver's side and another pair for the passenger's side, with the wipers 4 being disposed inwardly of the wipers 5 and constituting the primary or front wipers, while the wipers 5 constitute the secondary or side wipers. The several wipers are self-conforming to the varying curvature of the windshield surface areas in the respective paths which are traversed under the spring urge of their drive or actuating arms 6 and 7. Each wiper may be of blade form and comprises a flexible surface-conforming frame including pivotally connected primary and secondary yokes 8 and 9, Fig. 3, and a flexible backing strip 10 which latter in turn supports a squeegee or rubber blade body 11, as is shown more fully in copending application, Serial Number 161,086. The wiper arms are essentially identical each comprising a mounting section 12 and a pivotally mounted blade carrying section 13 under the urge of a spring 14 a well known construction, the section 13 having a terminal curved tongue 13' engaging in a blade carried clip 5'.

Figure 2:
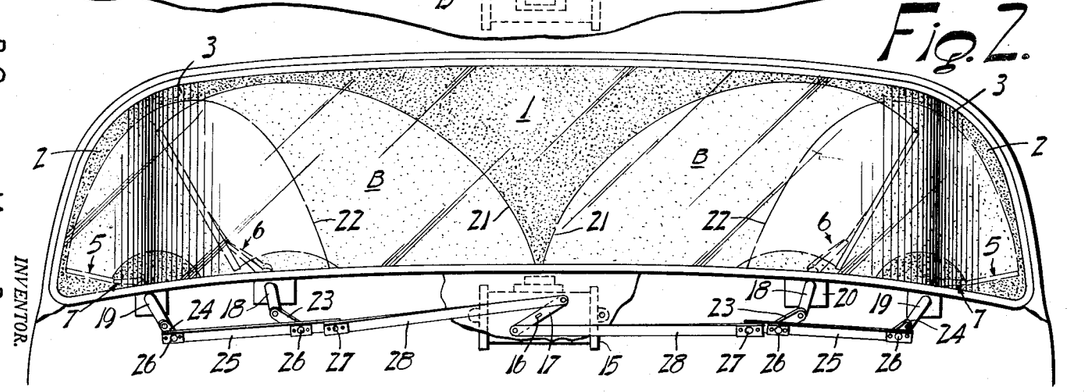
Fig. 2 is an interior view of the windshield showing the cleaner installation, parts of the instrument panel being removed.

Any suitable power unit may be employed for operating the wipers. A fluid or hydraulic motor indicated at 15 has an oscillatory drive shaft 16 with a double-throw lever arm 17. Inner and outer pairs of rock shafts 18 and 19 are journaled in the framing 20 at the lower side of the windshield to mount and oscillate the wiper arms 6 and 7, respectively. The inner shafts 18 are positioned directly in front of the driver and the passenger, or substantially so, while the shafts 19 are more to the side and have their axes diverging outwardly in a forward direction from the adjacent shafts 18. Preferably, the axes of the side shafts 19 lie in a plane radially of the curvature of the portion 3, or nearly so. This arrangement gives each, the driver and his passenger, an individual pair of cooperating wipers for cleaning the respective fields of vision immediately in front of him, each field comprising frontal and lateral portions that afford a broad straightahead vision. The front wipers clean paths, indicated at 21, and the side wipers 5 have paths 22 about the bends 3 of sharper curvature.

Within this broad field of vision is located a primary field or area A directly in the main line of sight of the driver and through which the forward vision is chiefly had. In accordance with the invention, this primary area is favored over the secondary field or area B to each side thereof by being wiped oftener. Herein, this is accomplished by bringing the front and side pivot shafts into such adjacency as to cause their wiper paths 21 and 22 to overlap in registry with the primary area A and to define the same. The relative positions of the two wiper shafts 18 and 19 will determine the elevation and extent of the overlapped area. Herein, each shaft is journaled within the outer arc of the sweep of the wiper on the companion shaft, with the outer arcs of the two paths intersecting above the line of sight. This common area, constituting the vital and principal vision area, is wiped back and forth by each wiper in timed order and is therefore wiped twice as many times as the outlying area B for each complete cycle of wiper movement. First one wiper moves over the common area, and then back, followed by the next wiper moving across the area and back, one wiper acting thereon at one end of its stroke while the companion wiper cleans the common area at the opposite end of its stroke.

The bend 3 in the windshield glass determines the left hand point of reversal for the driver's primary wiper since beyond the bend the outer end portion of the wiper is not sufficiently flexible to conform to it. Where the limit position of the wiper 4 to the left of the driver is semi-upright, the side wiper 5 will move in from the side and sweep the deposit downwardly to thereby afford an extra stroking of the primary vision area. Consequently, the primary area A will be wiped twice as often as the secondary area B with each wiper individually maintaining an optimum speed, such as that heretofore employed on automobiles. This overlapping of the wiper paths has the effect of oscillating a single wiper at twice the optimum speed but without the ill effects which flow from the use of a single wiper operating at an excessive speed, as above set forth. Swinging in substantial parallelism from different centers, the two wipers move across the primary field at different angles to scarify also and more effectively remove the vision-obscuring deposit, such as insects, from the shield surface.

The wipers of each cooperating pair are caused to move in synchronism and in parallel and for this purpose each rock shaft has a rocker arm fixed thereon. The rocker arm 23 of the rock shaft 18 is connected to a preferably shorter rocker arm 24 of the outer rock shaft 19 by a link 25 and ball and socket joints 26, the latter accommodating the angular movements about the divergent shaft axes. These links extend inwardly for connection by a third ball and socket joint 27 to a drive link 28 which in turn is pivotally connected ot one end of the drive arm 17 on the motor shaft. Therefore, when the motor is operating the oscillating drive shaft 16 will impart oscillation to the rock shafts 18 and 19 and to their connected wipers. The several ball joints 26, 27 will accommodate the relative displacement between the rocker arms as well as any irregular movement due to the fact that one rocker arm may be longer than the other, as shown in Fig. 2. Not only are the shafts 18 and 19 divergently related to each other but they are or may be also divergently related individually to the drive shaft 16. Therefore, the articulated linkage 25, 28 will serve to transmit the power around the curved contour of the windshield to the driven wiper shafts.

The windshield cleaner is unique and efficient in that it embodies a power unit which oscillates one or more pairs of wipers, with the wipers of each pair coacting to effectively increase the cleaning action of a given field of vision in a practical manner. The windshield cleaner is also effective in cleaning an area of main vision that is interposed between lesser used portions of the field of vision lying within the remote limits of travel of the pair of wipers.

Figure 5:
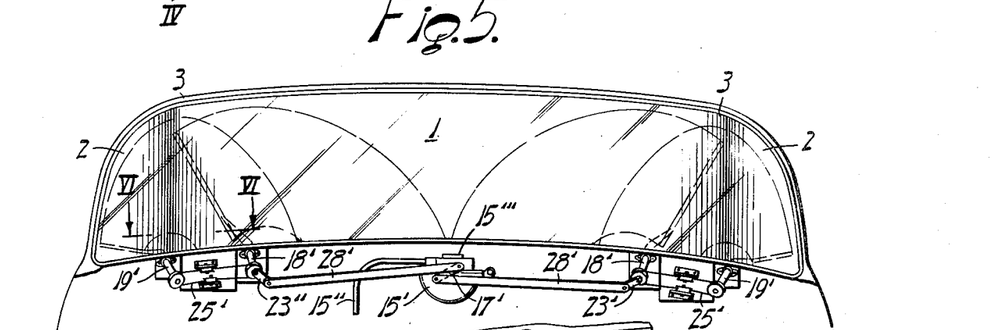
Fig. 5 is a view similar to Fig. 2 of a modification.
Figure 6:
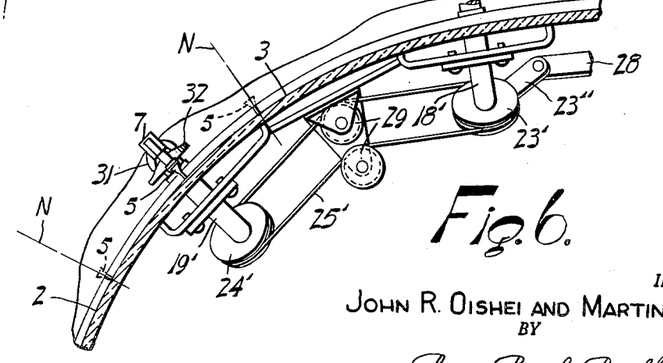
Fig. 6 is a horizontal sectional view taken about on line VI—VI of Fig. 5.

Figs. 5 and 6 depict a modified transmission which utilizes a flexible and endless cable 25' between the angularly displaced shafts 18' and 19' for each field of vision, each shaft carrying a pulley 23' (24') about which the cable passes. By means of suitable sheaves 29 the cable may be guided onto the angularly displaced pulleys for the proper transmission of power between the two shafts. The inner shafts 18', in addition to the pulleys 23', have rocker arms 23'' fixed thereon for operative connection to drive links 28' from the double-throw arm 17' on the shaft of a motor 15' of the suction-type. In this arrangement the drive links will oscillate the inner rock shafts 18' and, through the cable transmission, also rock the outer shafts 19' back and forth. A conduit 15'' extends from a parking control valve 15''' on the motor to a suitable source of vacuum, such as the intake manifold of the vehicle engine or a vacuum pump, not illustrated.

In both forms, the spacing of the wipers in each lateral pair is such that the wipers may park in end to end relation along the bottom molding of the windshield frame, as indicated in Fig. 1. When parked, the four wipers lie at the bottom of the shield and between the remote shafts 19. Suitable and well-known provision may be made to effect the parking of the wipers for the two fields of vision, such as that shown in Patent Number 2,344,949.

The placement of the outer shaft 19 at the bend 3 or toward the side permits the shaft to lie in a radial plane through which the wiper will pass in a normal attitude over the high point in the stroke. At this high point the wiper arm extends at the greatest angle from the actuating shaft, and therefrom the surface recedes so that the wiper arm will assume a lesser angle with respect to the shaft as it continues its sweep. The recession of the surface may be so pronounced that the wiper in oscillating about its axis will take on a more or less recumbent position during its stroke and result in an impaired performance and a possible scratching of the glass by the superstructure 8, 9, 10.

To secure the best performance, the wiper should maintain a generally erect or normal attitude at its point of wiping engagement with the curved surface throughout its path because in this normal position the backing strip 10 and the pressure applying yokes 8 and 9 are best poised for conforming the wiping blade 11 to the curved windshield surface under the spring urge of the wiper actuating arm. This is accomplished herein by a mechanical action serving to adjust the wiper automatically to maintain normal positional accord with the curving surface. In the embodiments of Figs. 7 through 11, the wiper arm is made to turn or twist about its longitudinal axis in accordance with the surface contour change. It incorporates a rockable blade mount that is associated with a governing member for imparting a controlled angular displacement of the blade.

Figures 7, 8, 9, 10, 11:
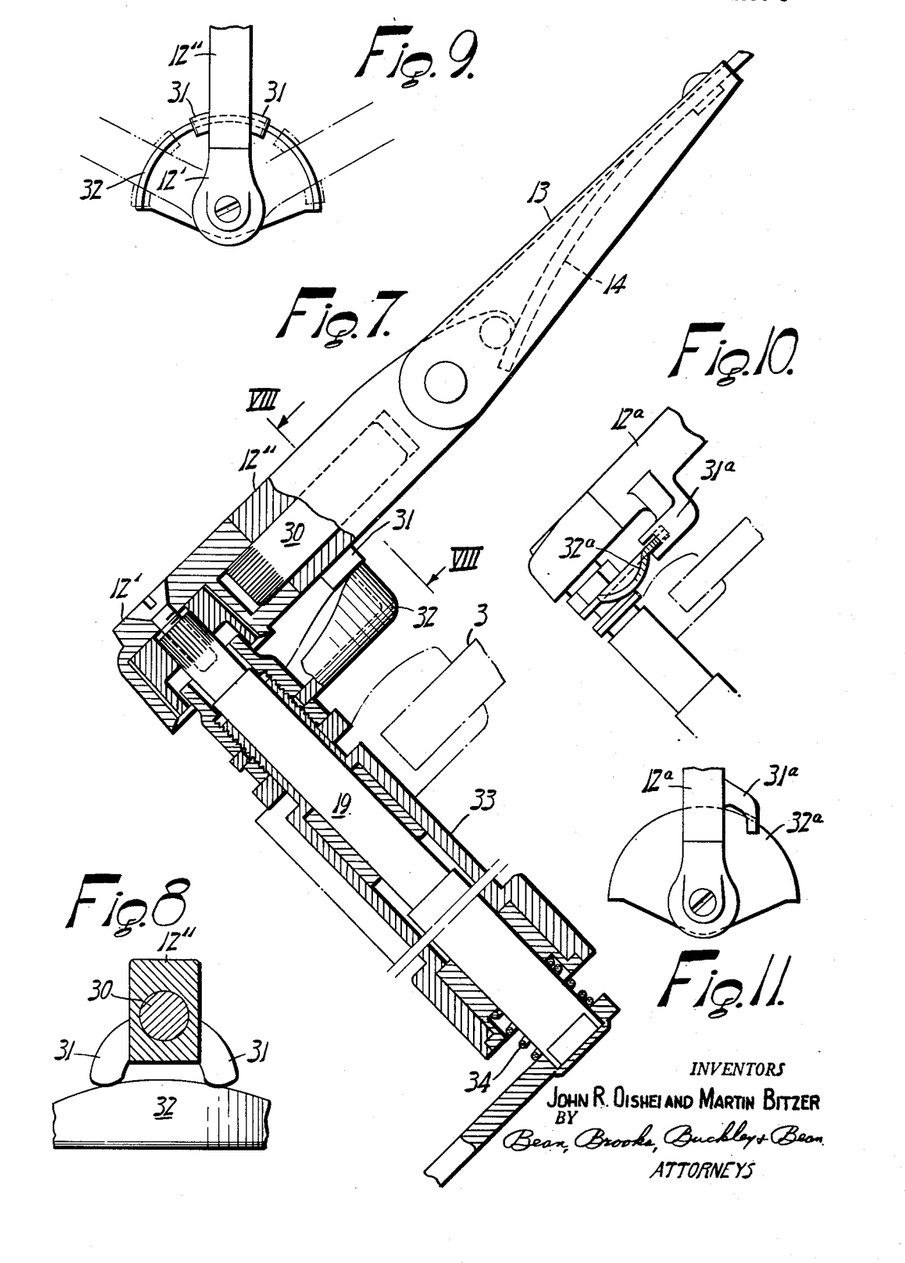
Fig. 7 is a view similar to Fig. 3 but showing the construction generally in longitudinal section.
Fig. 8 is a cross sectional view on line VIII—VIII of Fig. 7.
Fig. 9 is a fragmentary plan view of the arm shown in Figs. 3 and 7.
Figs. 10 and 11 are fragmentary views in side elevation and top plan, respectively, of another modification.

As illustrated more clearly in Figs. 7, 8 and 9, the mounting section of the arm assembly is divided to provide a shaft anchored part 12' and a rockable part 12'' which carries the hinged outer section 13. The rockable part 12'' is journaled on a pivot pin 30, fixed in the anchored part 12', and has a follower 31 tracking upon a cam contour of the governing member 32 for rocking the part 12'' and its blade carrying outer section 13 about a longitudinally extending axis substantially radial of the rockshaft to maintain constantly the normal attitude of the wiper, as is indicated by the broken line showing in Fig. 6.

The cam contour is patterned in accordance with that of the windshield surface.

In this embodiment the cam following action of the wiper arm proper or blade mount, consisting of part 12" and section 13, necessitates an in and out axial movement for the shaft carried part 12', and for this purpose the shaft 19 may be axially slidable in its bearing 33 to move as a unit with such arm mounting part 12'. The outward axial movement may be against the urge of a spring 34 which yieldably holds the follower upon the cam, or the cam may be double acting as shown in Figs. 10 and 11, wherein the cam ridge 32a has upper and lower contoured faces engaged by a straddling follower fork 31a extending from one side of the rockable arm part 12a.

Figures 12, 13, 15, 16:
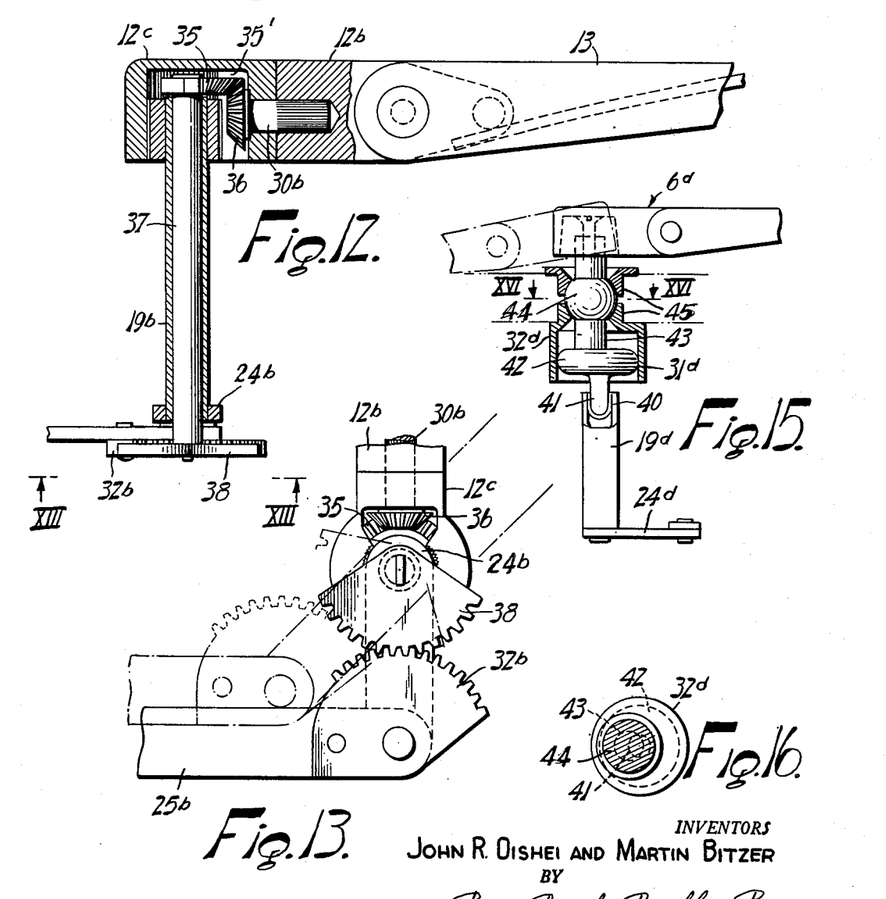
Fig. 12 is a fragmentary sectional view of a further modification.
Fig. 13 is a bottom plan view thereof as seen from the plane indicated by line XIII—XIII of Fig. 12.
Fig. 15 is a similar view of a still further modification.
Fig. 16 is a horizontal sectional view about on line XVI—XVI of Fig. 15.

If desired, the governing or controlling member may be arranged interiorly of the vehicle and of a different form to avoid the axial shifting of the rocker shaft. Such a modification is depicted in Figs. 12 and 13, wherein the blade mount 12b, 13 is fixed to an oscillating shaft or pivot pin 30b that finds journal support in the shaft anchored part 12c of the arm. This part is hollow to provide a gear chamber 35' for inclosing the bevel gears 35 and 36 that connect the shaft 30b to a second oscillating shaft 37 in turn journaled in the wiper rock shaft 19b. Fixed to the inner end of the shaft 37 is a gear 38 that meshes with a gear segment 32b having journal support on the rocker arm 24b. The link 25b, which connects the rocker arm 24b to a rocker arm 23, is fixed relative to the gear segment for moving therewith as a unit. Therefore, the relative movement between the link and the rocker arm 24b will cause the segment 32b to impart rotary movement to the gear 38 to rock the blade mount. The segmental gear 32b will be so designed and patterned to rock the blade mount in proportion to the surface curvature to maintain the wiper normal thereto.

By utilizing the governing member 32, 32a, or 32b, the wiper mount 12", 13, or 12b, 13, will be rocked to maintain the normal wiping position of the blade constant relative to the curved surface 3 as it passes thereover, as indicated by the normal lines N in Fig. 6. The wiper in one extreme position, while being normal to the surface at its point of contact, is angularly displaced from the attitude assumed in the opposite limit position. The wiper during the intermediate portion of its stroke will assume in between varying degrees of angular displacement about the longitudinal axis of the arm as determined by the governing member, the blade being generally normalized throughout the oscillatory stroke of the wiper by reason of the fact that the backing strip 10 is held substantially parallel to the underlying surface contour as the wiper moves from one to the other of adjoining surface areas having differing contours. This is characteristic of an irregularly convexed windshield wherein the surface contour is a compound curvature of different radii with or without a plane surface. The total blade displacement may exceed 20°.

Figure 14:
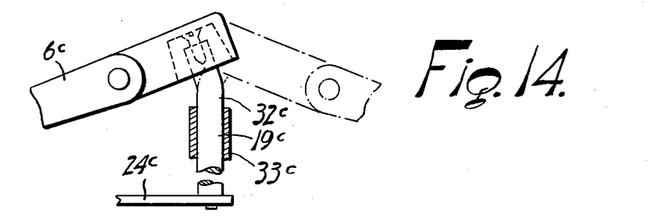
Fig. 14 is a fragmentary view of a further modification.

In the further embodiment of Fig. 14 the adjustment of the arm 6c to maintain the desired normal attitude of the wiper on the windshield curving surface is accomplished by a simplified governing or controlling means in the form of a crank 32c embodied in the wiper shaft 19c. With this arrangement the rocking motion of the wiper arm about its longitudinal axis is uniform and especially adapted for a cylindrical or conical glass surface portion having a fixed axis of generation. The shaft is journaled in a bearing sleeve 33c and provided with a rocker arm 24c.

In the embodiment shown in Figs. 15 and 16 the crank embodiment in the wiper operating shaft 19d, 43, has been combined with a confining housing or cam 32d by which the rocking action of the arm 6d may be regulated for a particular surface. Placement of the housing determines the twisting or rocking motion of the arms. In this embodiment the rock shaft 19d has its outer end formed with an axial bearing 40 to drivingly receive a stub shaft 41 from a wobble member 42 confined within the encircling housing 32d. A crank pin 43 extends from the opposite side of the wobble member and has a ball enlargement 44 which is journaled for substantially universal movement in the socket bearing parts 45 so that when the wobble plate is rocked back and forth by the rock shaft 19d the offset crank pin, constituting an extension of the rock shaft, will have imparted thereto a combined rocking and rotating motion. The outer end of the crank pin 43 is fitted to mount the wiper arm 6d thereon for the desired rocking action about its longitudinal axis to secure the normal attitude of the wiper throughout its path of movement over the curved surface.

Both wiper arms 6c and 6d are similar in construction to the inner arms 6 in that they each have a mounting section and a hinged blade carrying section.

It is obvious that the dual wiper arrangement for providing more frequent wiping cycles for the primary vision area may be employed alone with a single wiper on the passenger side if such is desired.

By having the front wiper terminate on its outward stroke within the path of the side wiper, the latter will carry away the deposit previously left by the primary. Therefore, when the primary returns to make another deposit the area is clean and ready for it. This avoids an unnecessary build-up of vision-obscuring matter which might otherwise be pulled back into the vision area by the retreating primary. On its rearward stroke the side wiper preferably sweeps over the side area in a downward direction to avoid any upstanding accumulation of moisture. The side wiper may, therefore, have a greater angular movement than the front wiper and consequently it will move at a faster angular velocity relative thereto. This speed differential in the operation of the two wipers is herein secured by making the rocker arm 24 for the side wiper shorter than the rocker arm 23 for the front wiper. This relatively greater sweep of the side wiper will not only enable an effective cleaning of the common primary area A but also secure a substantial cleaning of the side area. The position of the frontal wiper 4 at the end of its outward travel is within the path of the side wiper and its line of deposit extends in the general direction of movement of the side wiper to facilitate a complete removal of the deposit from the field of vision.

By utilizing the pairs of cooperating wipers on a windshield having adjacent front and side portions of slight and sharp curvatures, it is possible to maintain a broad field of vision with cleaning emphasis placed upon the more important primary area, and when the windshield cleaner is parked the several wipers will assume a position adjacent the bottom edge of the windshield outside of the field. The adjacent ends of the wipers, when parked, are spaced apart sufficiently to lie flat and free of each other to avoid interference when next called into operation. The proximity of the two wiper shafts 18 and 19 insures the superimposed relation of the wiper paths for defining the doubly wiped primary area. The primary wiper shaft is journalled directly in front of the driver, or substantially so, and this will enable the primary wiper cleaning practically the entire frontal portion of the driver's field of vision. In timed order the auxiliary wiper 5 will move in from the side and provide another wiping cycle for the primary area A. These alternating cycles of the two wipers provide clear vision ahead. Notwithstanding the angular displacement of the secondary shaft 24 around the bend toward the side portion 2, the two wipers move with a substantially parallel motion to insure the succession of wipes for the primary area free from interference should one wiper cling to the surface more than the other. The cooperating pairs of wipers for the plural fields of vision, one for the driver and the other for the passenger, move in synchronism toward and from each other, or they may swing together. The oscilatory wipers serve to increase the capacity for removing the moisture accumulation and accomplish their purpose without increasing the speed of oscillation.

The placement of the rockshafts 18 and 19 is such that the upper arcs of the respective wiper paths intersect immediately above the line of sight. This elevates the doubly wiped primary field of vision within the driver's range of vision. Preferably the two rockshafts are mounted one within a path extension of the other, or nearly so. The lateral wiper is journaled on the area of greatest curvature for its most efficient performance, so that when the wiper is on the bend and in alinement therewith the wiper will be substantially normal to the bend surface, and as it moves off the bend onto the receding front and side areas of lesser curvature, the wiper will be automatically disposed to maintain such normal attitude with the glass at the point of contact.

The foregoing description has been given in detail for clarity and not by way of limitation since the inventive principles involved are capable of assuming other physical embodiments without departing from the spirit of the invention and the scope of the appended claims.

What is claimed is:

1. A motor vehicle having a windshield providing straightahead fields of vision through the left and right sides thereof, left and right pairs of cooperating wipers for each field, a pivot shaft for each wiper connected for actuating the same, means tying the two pivot shafts of each wiper pair together for oscillation in unison, the distance between the two shafts of each pair being less than the radii of the outer arcs of the two wiper paths and such outer arcs intersecting above the forward line of sight through each field, and means for rocking the shafts.

2. A motor vehicle having a curved windshield providing a continuous surface from a frontal portion to a lateral portion, wiper arms pivoted beneath each portion, a wiper carried by each arm for being oscillated thereby over the respective portion, and means for oscillating the arms in unison, the arm pivots being arranged in such proximity that the outer arcs of the wiper paths intersect adjacent the top margins of the windshield.

3. In a motor vehicle having a curved windshield, a pair of oscillating wipers pivotally mounted at the lower side of the shield, power transmitting means tying the two wipers together for swinging in unison, the pivotal axes of the two wipers lying in forwardly divergent planes extending through the curved windshield and the spacing of the wiper pivots being less than the radius of the outer arc of either wiper path.

4. A motor vehicle having a windshield with frontal and lateral portions joined by a bend to provide a continuous streamlined surface from one portion to the other, an oscillating wiper operating over the frontal portion from a point adjacent its lower edge upwardly and outwardly toward the lateral portion but terminating in an elevated position at or adjacent the bend, an oscillating wiper operating over the lateral portion from a point adjacent its lower edge upwardly and around the bend and over onto the frontal portion in overlapping relation with said elevated position for wiping away any deposit left by the frontal wiper thereat, said wipers pivoting on divergently related axes, and power means oscillating the two wipers about their divergent axes in timed order to bring the frontal wiper to its elevated position on one stroke and the lateral wiper to wipe the elevated positional area on the return stroke.

5. A motor vehicle having a windshield with frontal and lateral portions joined by a bend to provide a continuous streamlined surface from one portion to the other, an oscillating wiper operating over the frontal portion from a point adjacent its lower edge upwardly and outwardly toward the lateral portion but terminating in an elevated position at or adjacent the bend, an oscillating wiper operating over the lateral portion from a point adjacent its lower edge upwardly and around the bend and over onto the frontal portion in overlapping relation with said elevated position for wiping away any deposit left by the frontal wiper thereat, said wipers pivoting on divergently related axes, power means oscillating the two wipers about their divergent axes in timed order to bring the frontal wiper to its elevated position on one stroke and the lateral wiper to wipe the elevated positional area on the return stroke, and normalizing means operable to maintain the lateral wiper in a normal attitude with the varying curved surface portions along the line of wiping contact.

6. In a curved windshield wiper structure for use on motor vehicles, or the like, comprising a pair of forwardly divergent wiper mounting shafts arranged to oscillate a pair of wiper blades laterally across the surface of the windshield through individual paths which overlap a relatively smaller common area of the windshield to provide a primary doubly wiped vision area for straight-ahead line of sight of the vehicle operator and a bordering relatively larger and singly wiped vision area to each side of the primary vision area, a power transmission operatively connecting the two shafts for oscillating them together but over paths of different extents, and a power unit operatively connected to the transmission.

7. In a motor vehicle having a windshield providing a driver's field of vision consisting of an elevated primary area in the line of sight straight ahead and a curved bordering secondary area, a pair of wipers cooperating to clean the field, a rock shaft generally normal with each area and having an arm carrying a respective wiper, and means operatively connecting the rockshafts to oscillate them with a substantially parallel motion, the paths of the wipers being jointly coextensive with the field of vision and overlapping in registry with the elevated primary area, said connecting means including a differential means for accelerating one wiper over the other.

8. In a windshield wiper structure for use on curved windshields, comprising a pair of wiper mounting shafts arranged to oscillate a pair of wiper blades laterally across the surface of the windshield through individual paths overlapping in a relatively smaller area of the windshield to provide a primary doubly wiped vision area for straight-ahead line of sight of the vehicle operator and a bordering relatively larger and singly wiped vision area, whereby the removal of the accumulating moisture is accelerated from the primary area, wiper arms supporting the blades for such oscillation, and means of governing rotation of one of the blades about its longitudinal axis to follow variations in the plane of the windshield surface to cause the wiping lip of the blade to maintain constant positional accord with the surface at the wiping line of contact, said governing means having a part acting on the outer end of the wiper arm for said one blade for rotatably adjusting it about the longitudinal axis of the arm.

9. A cleaner for a curved windshield surface, comprising a rock shaft, an arm fixed thereon and extending radially therefrom, a wiping blade carried by the arm, said arm having a shaft-fixed part and an outer blade-carrying part adjustable about the longitudinal axis of the arm radially of the shaft to adjust the blade for maintaining an attitude substantially normal to the surface, and a member connected to the blade-carrying arm part for rotatably adjusting it, said member coacting with a surface patterned in accordance with the surface curvature to control the extent of rotary adjustment thereby to maintain the normal attitude of the blade throughout its path over the curved surface.

10. A windshield cleaner for a curved shield surface having a broad frontal portion substantially flat or of slight curvature with opposite side portions joined thereto by bends of relatively sharper curvature, comprising spaced wipers having rock shafts journaled for sweeping the wipers over adjacent paths on the frontal portion of the shield, companion wipers having rock shafts journaled for sweeping their wipers around the respective bends in paths contiguous with the first paths, each companion wiper shafts being associated with a corresponding one of the first wiper shafts and forming therewith a pair of cooperating shafts the axes of which diverge in a forward direction, transmission means operatively connecting the angularly displaced shafts of each cooperating pair for rocking in unison, and drive means operatively connected to the first rock shafts to rock them and acting through the two transmission means to rock the companion shafts for sweeping the respective wipers to maintain a clean field of vision continuous from the frontal portion through the bends, with governing means associated with the companion wipers and operable to maintain their attitude on the shield surface substantially constant as such wipers move about the bends.

11. A cleaner for curved windshields having a broad frontal portion flanked by side portions of a sharper curvature, comprising spaced pairs of wipers, one pair for each side of the vehicle, an arm supporting each wiper, a rock shaft mounting each arm, there being two inner shafts for oscillating their wipers over the frontal portion and two outer shafts angularly displaced from the inner shafts for moving their wipers over and about the more sharply curved side portions, transmission means accommodating the angular displacement between each inner shaft and the adjacent outer shaft for rocking the latter in parallel motion with the former when the inner shaft is rocked, and a drive operatively connected to the two inner shafts to rock them concurrently.

12. A cleaner for curved windshields having a broad frontal portion flanked by side portions of a sharper curvature, comprising spaced pairs of wipers, one pair for each side of the vehicle, an arm supporting each wiper, a rock shaft mounting each arm, there being two inner shafts for oscillating their wipers over the frontal portion and two outer shafts angularly displaced from the inner shafts for moving their wipers over and about the more sharply curved side portions, means accommodating the angular displacement between each inner shaft and the adjacent outer shaft for rocking the latter and the former with a substantially parallel motion when the inner shaft is rocked, a drive operatively connected to the two inner shafts to rock them concurrently but in opposite directions, and parking means for arresting the drive with the inner and outer arms all extending inwardly from the sides of the vehicle to park the wipers between the two outer shafts.

13. In combination with a vehicle having a curved windshield, a windshield cleaner installation comprising a first pair of rockshafts mounted adjacent said windshield and lying in a plane adjacent the forward portion of said windshield, a second pair of rockshafts mounted adjacent said windshield and lying outwardly of said first pair of rockshafts but spaced therefrom in a direction toward the rear of the vehicle, a wiping element carried by each of said rockshafts for movement across the surface of said windshield, and power means for driving said rockshafts.

14. In combination with a vehicle having a curved windshield with a frontal portion and flanking lateral areas of greatest curvature, a pair of spaced primary rockshafts located adjacent said windshield on opposite sides of the center thereof, a wiper element carried by each of said primary rockshafts and movable thereby laterally up to the respective area of greatest curvature, a pair of secondary rockshafts located between the lateral edges of said windshield and said primary rockshafts and substantially at the areas of greatest curvature, a wiper element mounted on each of said secondary rockshafts for movement to either side of as well as across on the respective area of greatest curvature of said windshield, and means driving said rockshafts.

15. A curved windshield cleaner comprising a front wiper oscillatable about a fixed axis and sweeping in an arcuate path upwardly across a frontal area including the line of vision straight ahead, a side wiper journaled at one side of the front wiper about an axis angularly related to the fixed axis and movable from the side into said path for wiping intermittently across such area for additionally wiping the same, the outward limit of travel of the front wiper being within the path of the side wiper intermediate the ends of such latter path so that the deposit of the front wiper will be carried away by the side wiper, and means for oscillating said wipers.

16. A curved windshield cleaner comprising a front wiper sweeping in an arcuate path upwardly across a frontal area including the line of vision straightahead, a side wiper journaled to the side of the front wiper and movable from the side into said path for wiping intermittently across such area for additionally wiping the same, and mechanism for oscillating the wipers in synchronism but at relatively different speeds.

17. A windshield cleaner comprising a wiper blade, for use on a curved windshield, carried on an oscillating shaft by means of an arm that is pivoted on an axis extending lengthwise of the arm and substantially radial to said oscillating shaft, and position controlling means operating automatically with the angular position of said oscillating shaft for controlling the pivoted position of said arm.

18. A windshield cleaner according to claim 17, wherein the position controlling means includes a blade normalizing governing member and a second member coacting with the governing member to so control the pivoted position of the arm for maintaining a predetermined attitude of the blade upon an associated curved windshield.

19. A windshield cleaner according to claim 17, wherein the position controlling means includes a blade normalizing governing member having a cam contour for rocking the arm on such pivot axis, and a follower member coacting with the cam contour of the governing member to so control the pivoted position of said arm.

20. A windshield cleaner according to claim 17, wherein the position controlling means includes a blade normalizing governing member having a cam contour for rocking the arm on such pivot axis, and a spring pressed follower member coacting with the cam contour of the governing member to so control the pivoted position of said arm.

21. A windshield cleaner according to claim 17, wherein the position controlling means includes a blade normalizing governing member having a cam contour for rocking the arm on such pivot axis, and a spring pressed follower member coacting with the cam contour of the governing member to so control the pivoted position of said arm, said shaft having a laterally extending fixed part on which the arm is so pivoted.

22. A windshield cleaner according to claim 17, wherein the oscillating shaft is of hollow form and journaled in an outwardly extending direction, with said position controlling means extending through the hollow shaft and includes a blade-normalizing governing member adjacent the inner end of the shaft and a cooperating member responsive thereto to so control the pivoted position of said arm.

23. A windshield cleaner comprising a wiper blade, for use on a curved windshield, carried on an oscillating shaft by an arm assembly having a blade carrying means that is pivoted on an axis extending lengthwise of the arm assembly and extending substantially radial to said oscillating shaft, and position controlling means operating automatically with the angular position of said oscillating shaft for controlling the pivoted position of said blade carrying means to maintain the blade substantially normal to the windshield.

24. A windshield cleaner for wiping a curved windshield comprising an oscillating driving shaft having a fixed axis, means for oscillating said driving shaft, an arm connected to said shaft and adapted to be oscillated over the windshield by said shaft on said fixed axis, a wiper blade secured to said arm, means pivotally mounting said wiper blade relative to said shaft and on an axis substantially radial to said shaft, and position controlling means operating automatically with the angular position of said oscillating drive shaft for controlling the pivoted position of said blade to maintain the same substantially normal to the windshield.

25. An elongated windshield wiper arm assembly comprising a mounting section having means for mounting the assembly on a drive shaft with the longitudinal axis thereof at an angle to the drive shaft, and a blade carrying section pivotally mounted on said mounting section for pivotal movement about the longitudinal axis of said arm assembly for maintaining a predetermined attitude of the blade relative to the windshield, said carrying section having at least two parts spring hinged together with the hinge axis arranged substantially transversely of said longitudinal axis, said spring hinge adapted to urge a blade connected to one of said parts into wiping position on the windshield.

References Cited in the file of this patent

UNITED STATES PATENTS

| Number | Name | Date |
| --- | --- | --- |
| 856,191 | Boch | June 4, 1907 |
| 961,563 | Volckening | June 14, 1910 |
| 1,562,898 | Litot | Nov. 24, 1925 |
| 2,158,254 | Rosenberg | May 16, 1939 |
| 2,356,424 | Paton | Aug. 22, 1944 |
| 2,387,564 | Christel | Oct. 23, 1945 |
| 2,412,319 | Carey | Dec. 10, 1946 |

FOREIGN PATENTS

| Number | Country | Date |
| --- | --- | --- |
| 424,687 | Great Britain | of 1935 |
| 545,916 | Great Britain | of 1942 |